(12) United States Patent
Thompson et al.

(10) Patent No.: US 6,656,625 B1
(45) Date of Patent: Dec. 2, 2003

(54) GLASS-CERAMIC COATINGS AND SEALING ARRANGEMENTS AND THEIR USE IN FUEL CELLS

(75) Inventors: Christopher Thompson, Stoke-on-Trent (GB); Anthony Wood, Stoke-on-Trent (GB); Stephen Pyke, Staffordshire (GB)

(73) Assignee: Alstom UK Ltd., Rugby (GB)

( * ) Notice: Subject to any disclaimer, the term of this patent is extended or adjusted under 35 U.S.C. 154(b) by 0 days.

(21) Appl. No.: 09/446,219

(22) PCT Filed: Apr. 16, 1999

(86) PCT No.: PCT/GB99/01060

§ 371 (c)(1),
(2), (4) Date: Feb. 22, 2000

(87) PCT Pub. No.: WO99/54131

PCT Pub. Date: Oct. 28, 1999

(30) Foreign Application Priority Data

Apr. 16, 1998 (GB) ............................................. 9807977

(51) Int. Cl.$^7$ .......................... H01M 8/02; C03C 10/00; C03B 32/02; B32B 18/00

(52) U.S. Cl. ........................... 429/36; 429/34; 427/115; 427/419.3; 29/623.4; 156/89.12; 65/33.5; 428/426

(58) Field of Search ............................ 429/30, 32, 34, 429/35, 36; 427/115, 126.2, 419.3; 29/623.2, 623.4, 623.5; 156/89.11, 89.12; 65/33.5, 33.6; 428/426, 428, 432

(56) References Cited

U.S. PATENT DOCUMENTS

| 3,819,387 A | * | 6/1974 | Leger et al. ................... 501/33 |
| 4,105,826 A | * | 8/1978 | Thomas ....................... 313/623 |
| 4,199,340 A | | 4/1980 | Topping et al. |
| 4,315,991 A | * | 2/1982 | Hagy et al. .................... 501/26 |
| 4,615,935 A | | 10/1986 | Bendig et al. |
| 4,828,597 A | * | 5/1989 | Glascock et al. ........... 156/106 |
| 5,312,700 A | | 5/1994 | Ishida |
| 5,475,567 A | * | 12/1995 | Hearn ......................... 361/778 |
| 5,496,655 A | * | 3/1996 | Lessing ....................... 429/26 |
| 5,585,203 A | * | 12/1996 | Chikagawa et al. ........ 29/623.2 |
| 5,750,279 A | * | 5/1998 | Carolan et al. ............... 429/32 |
| 5,942,348 A | * | 8/1999 | Jansing et al. .............. 264/618 |
| 6,165,632 A | * | 12/2000 | Blum et al. .................... 429/12 |

FOREIGN PATENT DOCUMENTS

| EP | 0012422 | 6/1980 |
| EP | 0 503 776 A1 | 9/1992 |
| EP | 0 675 557 A | 10/1995 |
| EP | 0 834 949 A | 4/1998 |
| GB | 1 258 286 | 12/1971 |
| JP | 07 240217 A | 9/1995 |
| WO | WO 94/03657 | 2/1994 |
| WO | WO 97 13731 A | 4/1997 |

OTHER PUBLICATIONS

Database WPI, Section Ch., Week 9707, Derwent Publications Ltd., London, United Kingdom, Dec. 3, 1996, NGK Insulators Ltd, corresponds to JP 8–319181.

* cited by examiner

*Primary Examiner*—Randy Gulakowski
*Assistant Examiner*—Jonathan Crepeau
(74) *Attorney, Agent, or Firm*—Kirschstein, et al.

(57) ABSTRACT

To provide effective seals between the separator plates of fuel cells, particularly planar solid oxide fuel cells (SOFC's), a method of applying a glass-ceramic coating to such a separator plate comprises providing a laminar body incorporating a glass powder, e.g., a tape-cast sheet, forming a bond between the laminar body and the separator plate to form. an assembly comprising the separator plate and the laminar body, and heat-treating the assembly to convert the glass powder to a glass-ceramic.

26 Claims, 4 Drawing Sheets

GLASS-CERAMIC COATINGS AND SEALING ARRANGEMENTS AND THEIR USE IN FUEL CELLS

BACKGROUND OF THE INVENTION

This invention is concerned with a method of forming a glass-ceramic coating on a substrate and to coatings produced thereby, such coatings having particular but not exclusive utility in the provision of sealing arrangements between non-porous separator plates of fuel cells, particularly planar solid oxide fuel cells (SOFC's), and includes methods of producing such sealing arrangements.

The present invention has particular advantages when used to produce seals between separator plates which are metal or metallic: in the context of this specification the terms 'metal' and 'metallic' are to be interpreted as meaning not just plates made of metals and exclusively metal alloys, but also of oxide dispersion strengthened metal alloys which include a relatively small percentage of an oxide or oxides incorporated therein.

A planar SOFC comprises a stack of vertically spaced impermeable separator plates. These separator plates separate the reactant gases and also provide electrical connection between adjacent cells. In the space between each adjacent pair of plates is held one or more cells each comprising a solid electrolyte having an anode and a cathode. Clearly, in view of their separator function, the separator plates must not be porous as they comprise part of a gas-tight assembly. The reactant gases comprise a fuel gas (e.g. hydrogen or carbon monoxide) and an oxidant (e.g. oxygen or air) and are respectively supplied to the anode and the cathode by suitable ducts which may, for example, be provided by channels in the upper and lower surfaces of the adjacent separator plates. As is known, the reactions at the electrode cause a voltage. Connection between the electrodes and adjacent separator plates can be either by direct contact or via an electrically conducting interlayer. For example a current collector (e.g. a nickel grid) may be provided adjacent the anode and a conductive porous sheet may be provided adjacent the cathode or the cathode may contact a conductive coating on the separator plate.

SOFC's usually operates at temperatures in the range 750° C.–1000° C., though it is envisaged that they could operate at lower temperatures, possibly as low as 650° C. In a planar SOFC stack, high-performance seals between adjacent plates are required to ensure separation and containment of the reactant gases. It is known to use glass-ceramic materials to produce such seals, since glass ceramics can be formulated to be (a) stable in the oxidizing and reducing atmospheres of the stack at high temperatures and (b) un-reactive towards adjoining components during operation of the stack. However, difficulties have been experienced in creating seal arrangements which are additionally capable of bonding with high integrity to the separator plates without raising high stresses due to differing thermal expansion characteristics of the seals and the adjoining materials. A requirement has also emerged to facilitate the creation of glass-ceramic seals of sufficient thickness to accommodate the thickness of the cells and current contacts.

In a stack where a plurality of laterally adjacent cells (e.g., an array of four cells) are sandwiched between adjacent separator plates in the stack, the seal should also provide high temperature electrical insulation between adjacent bipolar plates. However, such electrical insulation is not required in stack designs in which only one cell is sandwiched between adjacent plates, because in such stacks the electrolyte separates the entire area of the bipolar plates, thereby providing the required electronic insulation.

One of the problems in the manufacture of planar SOFC's using glass ceramics as a means of sealing between adjacent separator plates in the stack is the need to ensure that the cell components remain in electrical contact in all parts of the stack throughout the process of assembling and sealing the stack. This can be difficult, because a glass-ceramic, once it has crystallized, does not deform appreciably, whereas the rest of the manufacturing process can involve volume changes at elevated temperatures in the layers of the stack. This is because the oxide mixtures used to form the anodes and the anode contacts are partially reduced by passing a reforming gas such as hydrogen through the stack.

SUMMARY OF THE INVENTION

An aim of the invention is to provide a glass-ceramic coating with improved bonding to a substrate, particularly a metallic substrate of the type used for separator plates in planar SOFC's.

Another aim of the invention is to provide an effective high-performance non-porous glass-ceramic seal between adjacent non-porous separator plates of planar SOFC's.

A further aim is to produce such a seal capable of electrically insulating adjacent biploar plates from each other and preventing electronic leakage therebetween.

Another aim is to provide such a seal which accommodates change in dimension of the stack during its manufacture.

A further aim of the invention is to provide a method of applying a glass-ceramic coating to a separator plate for a solid oxide fuel cell, so providing a base layer for at least one further layer required to complete a seal between confronting surfaces of adjacent separator plates.

It is to be understood that a glass-ceramic is an inorganic, polycrystalline material formed by the controlled crystallization of a glass; a glass on the other hand is an inorganic material formed by fusion but wherein the material has cooled to a rigid condition without crystallizing.

According to a first aspect of the invention, a method of providing a glass-ceramic coating having improved bonding to a substrate comprises the steps of: depositing a first bonding layer of glass powder mixed with a binder directly onto the substrate (preferably using a screen printing or spraying process); adhering a laminar body comprising glass powder mixed with a binder to the first layer to form a second layer which is substantially thicker than the first layer, the glass powder in both layers being of a composition such as to form a glass-ceramic on heat treatment; and heat treating the resultant green coating on the substrate to drive off the binder and convert the glass powder layers to glassceramic layers.

According to a second aspect of the invention, in a fuel cell, a high-performance seal between confronting faces of adjacent non-porous separator plates comprises at least one glass-ceramic layer on at least one of the confronting faces and at least one glass seal layer interposed between the at least one glass-ceramic layer and the other separator plate.

Preferably, the at least one glass-ceramic layer is a duplex layer, comprising a first glass-ceramic layer for bonding the seal to the separator plate and a second glass-ceramic layer superimposed on the first glass-ceramic layer, the glass seal layer being interposed between the second glass-ceramic layer and the adjacent separator plate, the second glass-ceramic layer being substantially thicker than the first glass-ceramic layer.

Glass-ceramic layers are may be provided on both confronting faces of the separator plates, the glass seal layer being interposed therebetween.

The at least one glass-ceramic layer may for example comprise compositions in the $SiO_2$—$CaO$—$MgO$—$Al_2O_3$ system, the composition being adjusted to optimize its ability to bond with the separator plate surface and/or to optimize its thermal expansion coefficient with respect to the thermal expansion coefficient of the separator plate to which it is attached. Where a duplex glass-ceramic layer is utilized, the first and second layers are preferably of different compositions to optimize bonding of the seal to the separator plate surface in the first layer while also optimzing the thermal expansion coefficient of the second layer.

The at least one glass seal layer may for example comprise compositions in the $SiO_2$—$BaO$—$CaO$-$Al_2O_3$ system.

The invention further includes a method of forming a glass-ceramic coating on a substrate comprising a separator plate of a solid oxide fuel cell, which method comprises providing a laminar body incorporating a glass powder, bringing the laminar body into contact with the substrate, forming a bond between the laminar body and the substrate to form an assembly comprising the substrate and the laminar body and heat treating the assembly to convert the glass-powder to a dense glass-ceramic layer.

The laminar body preferably incorporates a binder and prior to bringing the laminar body and the substrate into contact a solvent is applied to the substrate and/or to the laminar body whereby when the laminar body and the substrate are brought into contact an adhesive bond is formed between the laminar body and the substrate; during heat treating of the assembly the binder is burned out before formation of the glass-ceramic.

Alternatively, prior to bringing the laminar body and the substrate into contact, a thin bonding layer incorporating a glass powder of composition such as to form a glass-ceramic upon heat treatment is applied to the substrate to provide an bonding layer to which the laminar body is then bonded. In this embodiment the bonding layer may be applied by spraying or screen-printing, the laminar body then being applied while both layers are in the green condition. During heat treatment, the glass-powder in the bonding layer becomes a glass-ceramic layer and forms a bond between the substrate and the layer produced by the laminar body. The glass-powder of the bonding layer may have a different composition to that of the glass powder incorporated in the laminar body, the glass-powder compositions of the laminar body being optimized to reduce thermal stress between the substrate and the seal on formation of the glass-ceramic and the glass-powder compositions of the bonding layer being optimized so as to flow upon melting and wet the substrate before crystallization occurs.

It is particularly envisaged that the above method is utilized to form a seal between two The or each separator plate may be formed of a metal or a metal alloy, e.g., a ferritic stainless steel or a high chrome alloy; such a chrome alloy may have a composition including Cr, Fe and $Y_2O_3$, for example 95%Cr, 5%Fe and 1% $Y_2O_3$. Further, the or each plate may be coated with an alloy or an oxide e.g. with an oxide of formula $La_xSr_{1-x}CrO_3$ The laminar body mentioned above comprises a mixture of glass powder and a binder in the form of a tape or sheet of material (produced, e.g., by tape-casting or calendering). The tape or sheet can be stamped out, prior to application, so that the coating covers a defined area. Applying coatings via such a stamped out unfired (or green) tape enables complex, defined areas to be coated onto the (planar) substrate. By fixing the tape to the substrate in the green state, there is no or at least negligible in-plane shrinkage. Further, the coating thickness can be closely controlled, say in the range 100 $\mu$m–3 mm, by appropriate selection of green tape thickness. To ensure adhesion of the coating during heat-treatment and conversion to a dense glass-ceramic, a bond is required to fix the unfired (green) tape to the substrate. Two methods have been found especially effective to achieve this:

(i) In a first method the tape incorporates an organic binder of a composition such that application of a suitable solvent to the surface of the substrate and/or tape prior to contact therebetween will make the binder sufficiently tacky to cause a green-state bond between the tape and substrate. The intimate contact this causes between the glass powder and substrate surface is maintained during bum-out of the binder and fusion of the glass to form the glass-ceramic.

(ii) In a second method a duplex glass-ceramic layer is produced because a glass powder bonding layer is first applied to the substrate (e.g. by spraying or screen-printing) and while this bonding layer is still "wet ", a further green tape layer is adhered to the bonding layer, thus securing both layers to the substrate. The powders in both layers fuse during subsequent heat-treatment to bond with the substrate. The glass powder in the bonding layer can be the same or of a different composition to that in the overlying tape. By using a glass powder of different composition to that in the tape, a graded interface is obtained which offers the following advantages:

improved adhesion; by utilized a glass of any appropriate composition which, in the glass state prior to crystallization; flows and wets the substrate more effectively than the glass in the overlying layer;

improved oxidation resistance at the substrate/glass-ceramic interface since the amount of porosity at this interface which could allow oxidation of the substrate, specifically a metal substrate, is reduced due to the more effective wetting of the substrate;

reduced stresses by grading differences in thermal expansion between the substrate and the overlying glass-ceramic layer.

In providing a seal for an SOFC, a glass-ceramic coating is formed as indicated above (single or duplex layers), and a sealing glass layer is then provided so that the seal is effectively a double layer comprising the glass-ceramic coating and a sealing glass layer. The combination of glass and glassceramic layers provide a gas-tight seal to separate and contain the reactant gases and electrically isolate adjacent bipolar plates. The main function of the glass-ceramic layer is to provide high temperature electrical insulation between the bipolar plates although it also must be gas-tight to contain the reactant gases. Conversely, the glass seal layer provides some measure of electrical insulation although not having as high electrical resistance as the glass-ceramic at the operating temperature. By using a glass rather than a glass-ceramic for the actual sealing stage of stack assembly the seal can continue to deform after sealing (under weight of the stack) to ensure the cell components remain in electrical contact through the stack. A glass is able to deform by viscous flow whereas a glass-ceramic, once crystallized, does not deform appreciably. The glass seal can be applied as a sheet or as a powder glass/binder mixture.

By using a glass powder composition that gives a glass seal layer of high viscosity during the heat-treatment, flow of the glass is minimized ensuring that coating thickness can be closely controlled and that the coating will closely conform to the stamped out pattern of the laminar body.

Compositions and heat-treatments of the glass-ceramic layers are selected so that their A. thermal expansions are closely matched to that of the separator plates to minimize stresses during thermal cycling. This may be achieved, for example, by producing two different glass powders in the $CaO—MgO—Al_2O_3—SiO_2$ system which have widely different coefficients of thermal expansion. The two glass powders may then be mixed together in the appropriate ratio to give a glass-ceramic coating composition of the required thermal expansion. The coefficients of thermal expansion can for example be varied in the range $8.5–11.5×10^{-6}K^{-1}$, 25–1000° C.

The glass-ceramic layer provides high temperature electrical insulation between adjacent bipolar plates is stable in the SOFC operating environment (750–1000° C. and oxidizing/reducing atmospheres) and is gas-tight.

The bipolar plate could be made of a Cr alloy, e.g. having a composition 94%Cr, 5%Fe, 1%$Y_2O_3$. The plate may be coated with an oxide layer, e.g. $La_xSr_{1-x}CrO_3$, or another corrosion resistant alloy or metal such as ferrite steel.

BRIEF DESCRIPTION OF THE DRAWINGS

Embodiments of the invention will now be described by way of example with reference to the accompanying drawings in which:

FIGS. 3(a) to (e) illustrate a second method of applying a glass-ceramic coating;

DETAILED DESCRIPTION OF THE PREFERRED EMBODIMENT

Figure 1:
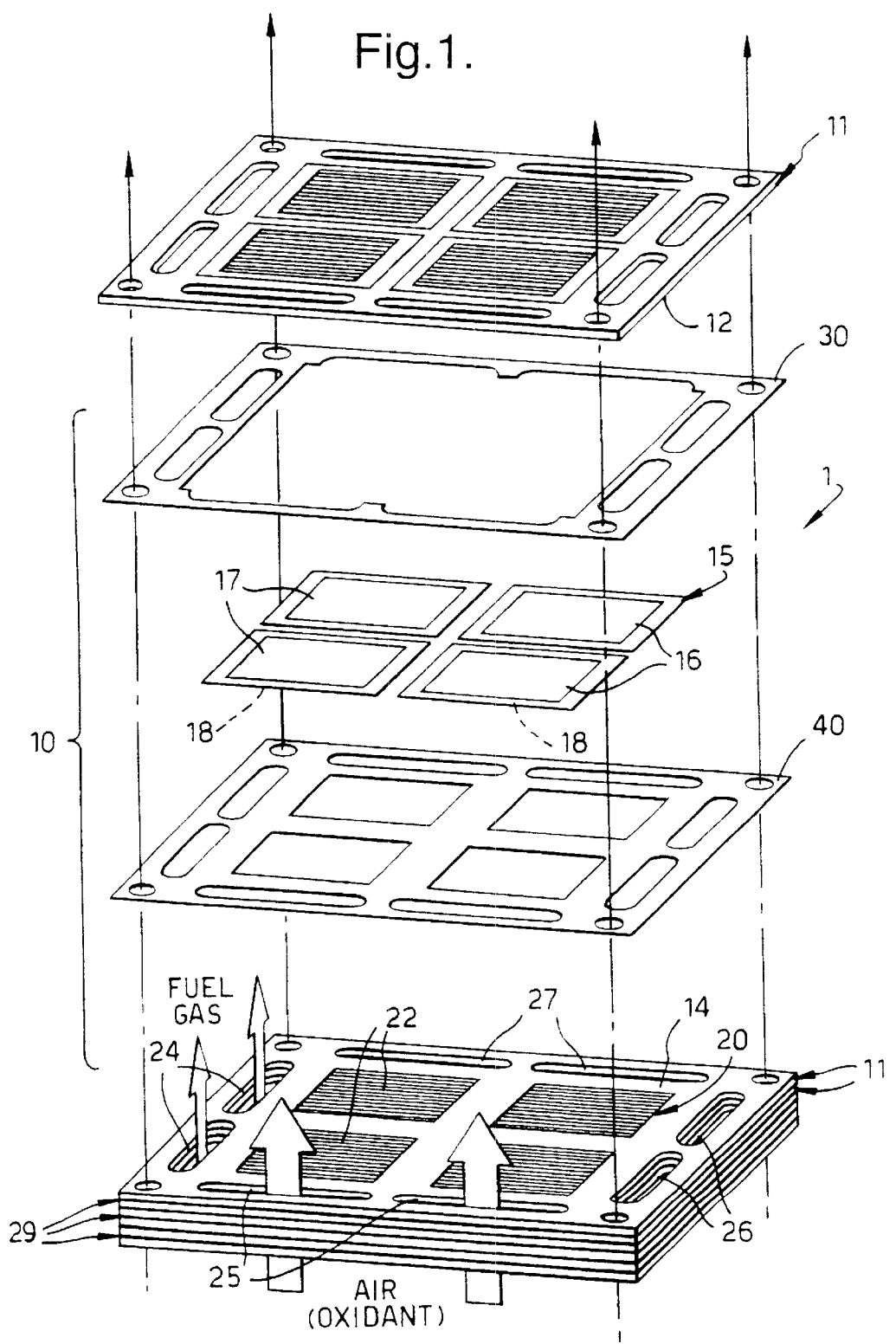
FIG. 1 shows a view of a planar array solid oxide fuel cell with one cell unit of the stack being illustrated in exploded view
Figure 4A:
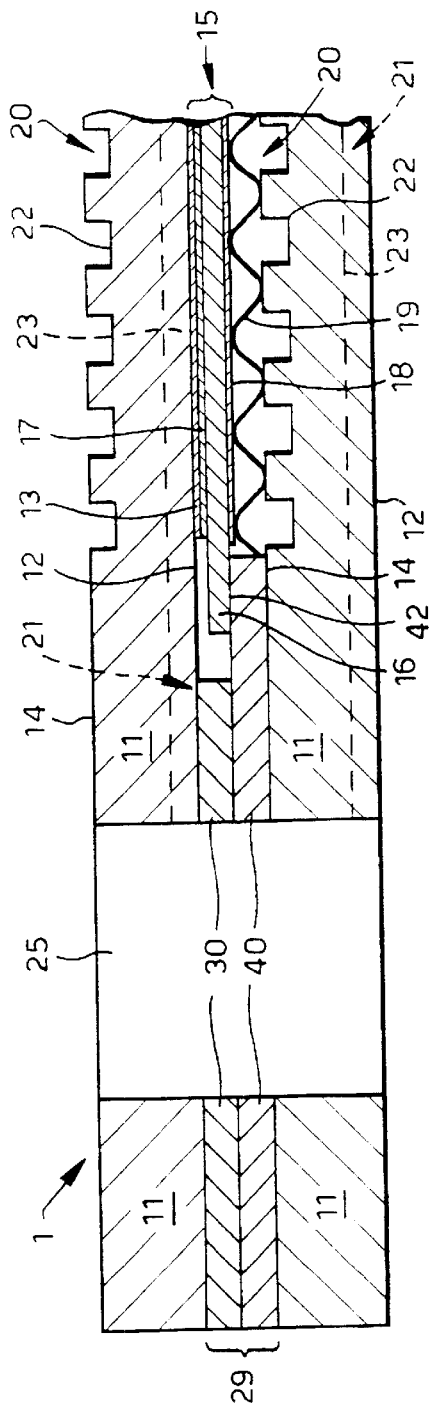
FIGS. 4(a) to (d) show partial cross-sections of four solid oxide fuel cells, each with a different seal arrangement between their adjacent separator plates.

As shown in FIGS. 1 and 4(a), the cell assembly 1 is of rectangular section and comprises a stack of cell units each of which comprises a current generating and collecting assembly between adjacent separator plates 11. Plates 11 are also referred to as bipolar plates because each of them contacts (directly or indirectly) solid oxide cathode elements 17 on their lower or cathode-contacting faces 12 and anode elements 18 on their upper or anode-contacting faces 14.

Reference numeral 13 in FIG. 4(a) indicates a conductive layer applied to face 12 to improve electrical contact between the separator plate and the cathode 17; the layer 13 may take the form of a porous sheet.

Reference numeral 15 diagrammatically illustrates a layered assembly comprising an array of solid electrolytes 16 each with an oxide cathode layer 17 on one (the upper) surface and an anode layer 18 on the other (lower) surface. As shown in FIG. 1 the layered assembly takes the form of a two-by-two electrode array but other arrangements are possible, e.g. the layered assembly may be in the form of a single electrode or it could be in 3×3 or 2×4 arrays, for example. The porous layer(s) or sheet(s) 13 will be dimensioned to correspond with the array. As shown in FIG. 4(a), a current collector 19, e.g. in the form of a nickel grid, is affixed below the anode 18, on top of anode-contacting surface 14 of plate 11.

As seen in FIGS. 1 and 4(a), each bipolar or separator plate 11 is formed with a gas flow channel arrangement 20, 21 formed respectively on its upper surface and its lower surface, through which channel arrangements flow the fuel gas and the oxidant gas respectively. The channel arrangements 20, 21 take the form of parallel channels 22 in the upper surface and parallel channels 23 in the lower surface, the channels in the respective surfaces being oriented transversely relatively to each other.

The gas flow channels 22 in the upper surface distribute a fuel gas (e.g. hydrogen, carbon monoxide, methane, or natural gas) entirely and evenly over the adjacent anode 18 and the gas flow channels 23 in the lower surface distribute the oxidant gas (e.g. oxygen, air) entirely and evenly on the adjacent cathode 17.

The separator plates are formed with apertures 24, 25, 26 and 27 therethrough, so that when the stack of cells is assembled they form, respectively, passages for fuel gas to reach channels 22, passages for oxidant gas to reach channels 23, passages for the exhaust of spent and unused fuel gas and passages for the exhaust of spent and unused oxidant gas.

Reference 29 indicates a sealing arrangement between adjacent separator plates and comprises a layer 30 of glass-ceramic insulation and a sealing layer 40 of glass or of glass and glass ceramic.

The glass-ceramic layer 30 is deposited onto the cathode-contacting face 12 of the separator plate 11 prior to assembly of the SOFC stack and the glass (or glass and glass-ceramic) layer 40 bonds together adjacent separator plates and seals the electrolyte assembly to the separator plates during manufacture of the stack at elevated temperatures. Both layers 30 and 40 are of course shaped as required to accommodate the chosen geometry of the SOFC's components. As previously explained, the glass-ceramic layer 30 is formed utilizing a laminar body (e.g. in the form of sheet or tape) which incorporates a suitable glass powder and an organic binder. The laminar body is pre-shaped to the required geometry of layer 30 (e.g. by stamping) as necessary.

Figure 2A:
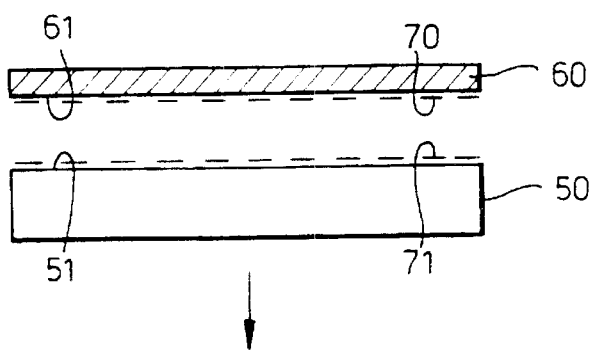
FIGS. 2(a) to (c) illustrate a first method of applying a glass-ceramic coating.
Figure 2B:
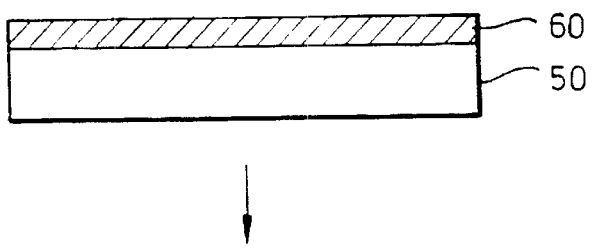
Figure 2C:
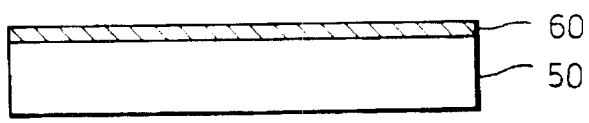
Figure 3A:
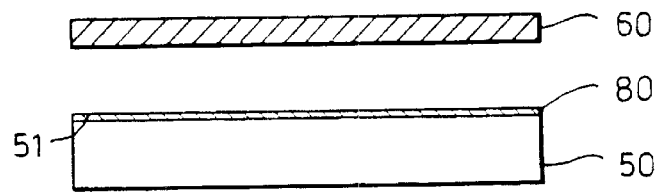
Figure 3B:
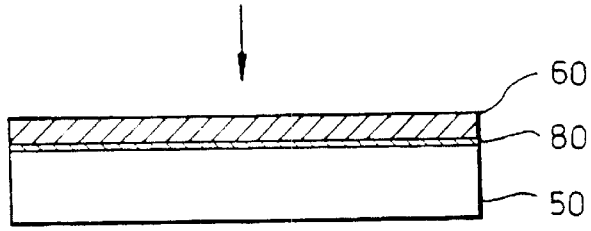
Figure 3C:

In FIG. 2(a) the substrate 50 (e.g. fuel cell separator plate) and/or the tape (or sheet) 60 are shown as having a suitable solvent 70, 71 (e.g. ethanol or methanol) applied to one or both surfaces 51, 61 thereof, which solvent renders the binder in the tape tacky to hold the tape in place when brought into contact with the substrate, see FIG. 2(b). FIG. 2(c) shows the assembly after heat treatment to form a glass-ceramic coating 62. Alternatively, in FIG. 3(a) a thin bonding layer 80 comprising glass powder in a binder is first applied as a bond layer to the substrate surface 51, e.g. by spraying or screen-printing, and the green tape 60 is then applied thereto, see FIG. 3(b). The composition of the glass powder in layer 80, like that of layer 60, is such as to produce a glass-ceramic layer after heat treatment. However, it is nevertheless advantageous if the composition of layer 80 is different from that of layer 60 so as to encourage ready wetting of the surface 51 by the molten glass in layer 80 during heating and the subsequent formation of a graded glass-ceramic coating. FIG. 3(c) illustrates the finished coating after heat treatment, comprising a thick outer glass-ceramic layer 62, say between about 100 µm and 3 µm in thickness, and a thinner inner glass-ceramic bond layer 82, say less than 50 µm in thickness. These layers are shown as distinct, but in reality during heat treatment would grade into each other.

Figure 4B:
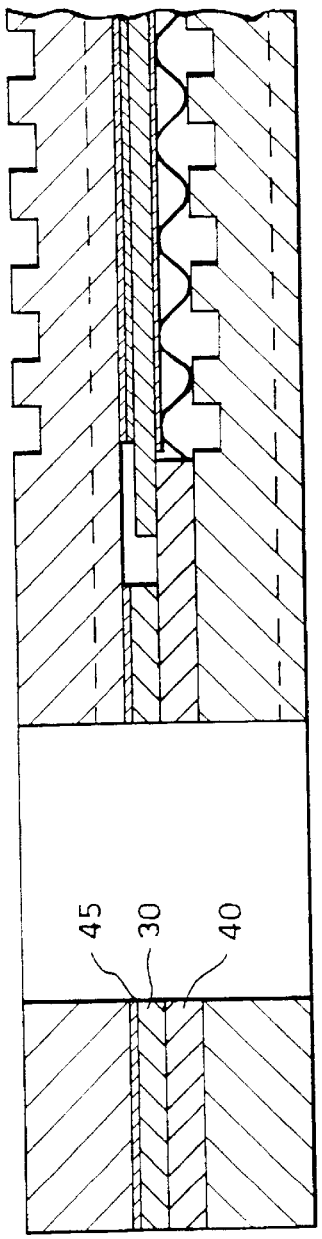

FIGS. 4(a) to (d) illustrate details of various forms of seals in fuel cell units. FIGS. 4(b), (c), and (d) are identical to FIG. 4(a), except with regard to the inter-plate sealing arrangement 29. Hence, reference numerals are only provided in FIGS. 4(b) to (d) where necessary to identify differences.

In the embodiment of FIG. 4(a) is shown the fuel cell unit of FIG. 1 with a seal formed by a glass-ceramic layer 30 formed as described with reference to FIG. 2 or FIG. 3 and a glass layer 40, with the glass layer being of sufficient area to bind and seal to the solid electrolyte 16, as shown at interface 42.

In FIG. 4(b) is shown an arrangement which in addition to the layers 30, 40 of FIG. 4a comprises a screen-printed glass-ceramic bond layer 45 formed on the cathode face 12 of the separator plate.

Figure 4C:
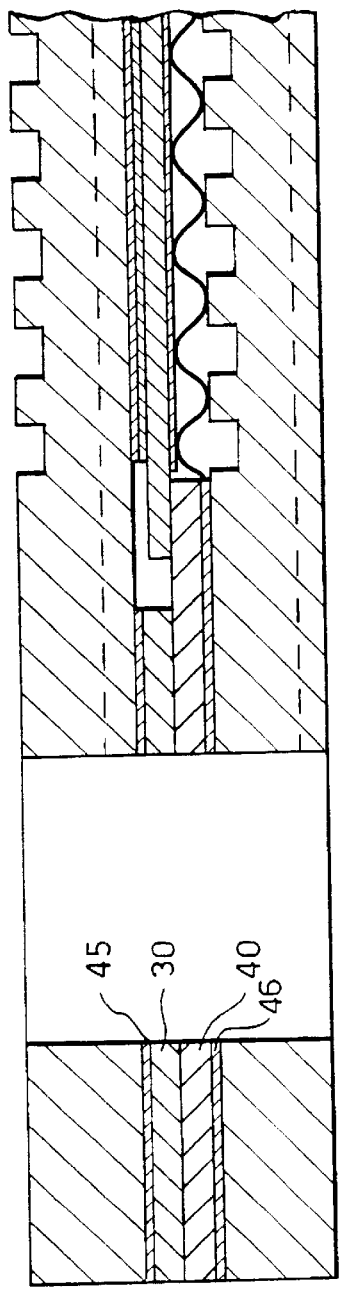

In FIG. 4(c) screen-printed glass-ceramic bond layers 45, 46 are provided respectively on both cathode- and anode-contacting faces of the separator plates, in addition to the layers 30, 40. However, such a layer 46 may be of more value as a protective layer than as a bonding layer, by forming a barrier between the seal layer 40 and the separator plate, to obviate the possibility of unwanted reactions between the seal layer 40 and the separator plate.

Figure 4D:
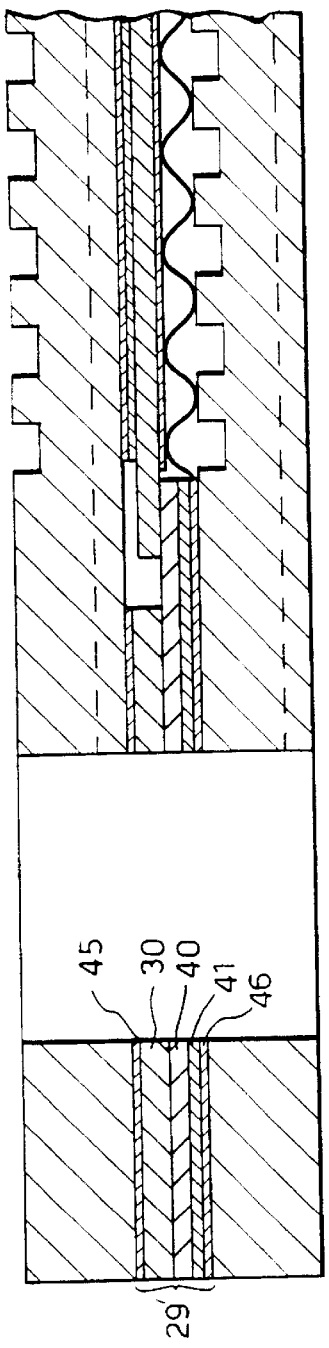

FIG. 4(d) shows a modification of the embodiment of FIG. 4(c) but in this embodiment an additional screen-printed glass-ceramic layer 41 is provided between sealing glass layer 40 and glass-ceramic bond layer 46.

It will be seen from the above that by suitable selection of the number and composition of the glass layers in the inter-plate sealing arrangement $291^d$, it is possible to tailor their properties to simultaneously achieve, during manufacture and service of the SOFC stack, good bonding to the plates 11; good matching of thermal expansion coefficients; good sealing and insulation between plates 11 and between adjacent cells in each planar array of cells; and good electrical contacts within the cells.

The following Table gives exemplary compositions of glasses and glass-ceramics useful for putting the present invention into effect.

| Weight percent of oxide | $SiO_2$ | $Al_2O_3$ | CaO | MgO | BaO | $TiO_2$ |
|---|---|---|---|---|---|---|
| Sealing glass layer | 43.9 | 6.6 | 13.2 | | 36.3 | |
| Glass-ceramic bond layer | 52.8 | 6.9 | 17.2 | 19.1 | | 4.0 |
| Glass-ceramic 1 | 59.0 | 7.0 | 20.8 | 13.2 | | |
| Glass-ceramic 2 | 55.0 | 5.0 | 10.0 | 30.0 | | |

Glass-ceramics 1 and 2 are examples of glass-ceramics having thermal expansion coefficients within the range $8.5–11.5 \times 10^{-6} K^{-1}$, 25–1000° C., as required to enable close matching of the expansion characteristics of a multi-layer sealing arrangement such as $29^1$ to the separator plates 11. Powders of such differing compositions and thermal expansion coefficients can also be mixed with each other to produce glass-ceramic layers with thermal expansion characteristics intermediate the two extremes.

It should be understood that although the sealing glass layers such as layer 40 in FIGS. 4(a) to (d) are formulated to remain in the glassy state during manufacture of the SOFC stack, so as to accommodate any dimensional changes during manufacturing processes involving high temperatures, it is nevertheless likely, and in fact preferred, that during subsequent service or heat-treatment, the glass sealing layers will progressively crytallize into the glass-ceramic state, so giving a stronger and less reactive sealing arrangement between the separator plates. The essential requirement for the sealing layer during manufacture of the SOFC stack is that the sealing layer must remain in the glassy viscous molten state until the anode reduction process has been completed and the consequent volume changes have ceased.

We claim:

1. A high-performance seal between confronting faces of adjacent separator plates in a planar, solid oxide fuel cell stack, comprising: at least one glass-ceramic layer on at least one of the confronting faces of one of the separator plates, and at least one glass seal layer interposed between the at least one glass-ceramic layer and an adjacent separator plate, the at least one glass-ceramic layer being a duplex layer which comprises a first glass-ceramic layer for bonding the seal to the one separator plate, and a second glass-ceramic layer superimposed on the first glass-ceramic layer, the at least one glass seal layer being interposed between the second glass-ceramic layer and the adjacent separator plate, the second glass-ceramic layer being substantially thicker than the first glass-ceramic layer, the first and second layers being of different compositions to bond the seal to a surface of the separator plate in the first layer, while also matching a thermal expansion coefficient of the second layer with respect to a thermal expansion coefficient of the separator plate to which it is attached.

2. A method of forming a glass-ceramic coating on a substrate comprising a separator plate of a solid oxide fuel cell, the method comprising the steps of:
   a) applying to the substrate a bonding layer incorporating a glass powder and a binder;
   b) providing a laminar body incorporating a glass powder and a binder;
   c) applying a further layer on top of the bonding layer by bonding the laminar body to the bonding layer while both are in a green condition to form an assembly comprising the substrate, the bonding layer and the laminar body, the glass powder of the bonding layer having a different composition to that of the glass powder of the laminar body, the glass powder in the bonding layer having a composition selected to bond with the substrate; and
   d) heat-treating the assembly to convert the glass powder layers to glass-ceramic material.

3. The method according to claim 2, in which the bonding layer is applied by spraying or screen-printing.

4. The method according to claim 2, in which the glass powder compositions of the bonding layer and the laminar body are selected to have thermal expansion coefficients when in the glass-ceramic state which closely match the expansion characteristics of the substrate.

5. The method according to claim 2, in which the glass powder composition of the bonding layer is such that, when in its glass state prior to crystallization, the glass powder flows and wets the substrate, thereby achieving a bond at its interface with the substrate.

6. The method according to claim 2, further comprising the step of applying a glass layer to the laminar body, said glass layer having a composition which remains in a glassy viscous state after crystallization of the laminar body into a glass-ceramic layer.

7. The method according to claim 2, wherein the separator plate is formed of one of a metal and a metal alloy.

8. The method according to claim 7, wherein the separator plate comprises a high chrome alloy.

9. The method according to claim 7, wherein the separator plate has a composition including Fe and $Y_2O_3$.

10. The method according to claim 2, wherein the separator plate is coated with one of an alloy and an oxide.

11. The method according to claim 10, wherein the separator plate is coated with an oxide of formula $La_xSr_{1-x}CrO_3$.

12. A fuel cell having separator plates each coated by the method according to claim 2.

13. A fuel cell having separator plates each sealed by the method according to claim 2.

14. A high-performance seal between confronting faces of adjacent separator plates in a planar, solid oxide fuel cell stack, comprising: duplex glass-ceramic layers bonded to both confronting faces of adjacent separator plates, and at least one glass seal layer interposed therebetween, each duplex layer comprising a first glass-ceramic layer for bonding the seal to the separator plate, and a second glass-ceramic layer superimposed on the first glass-ceramic layer.

15. The high-performance seal according to claim 14, in which the second glass-ceramic layer is substantially thicker than the first glass-ceramic layer.

16. The high-performance seal according to claim 14, in which the at least one glass-ceramic layer comprises at least one composition in the $SiO_2$—$CaO$—$MgO$—$Al_2O_3$ system.

17. The high-performance seal according to claim 16, in which the at least one composition has a thermal expansion coefficient which matches a thermal expansion coefficient of the separator plate to which it is attached.

18. The high-performance seal according to claim 14, in which the at least one glass seal layer comprises a composition in the $SiO_2$—$BaO$—$CaO$—$Al_2O_3$ system.

19. A fuel cell having the high-performance seal according to claim 14.

20. A method of providing a glass-ceramic coating-having improved bonding to a substrate in a fuel cell, comprising the steps of: depositing a first, bonding layer of a glass powder mixed with a binder directly onto the substrate; adhering a laminar body comprising a glass powder mixed with a binder to the first layer to form a second layer which is substantially thicker than the first layer, the glass powder in the first layer having a different composition to that of the glass powder in the second layer, the glass powder in the first layer having a composition selected to bond with the substrate; the glass powder in both layers, being of a composition such as to form a glass-ceramic on heat treatment; and heat-treating a resultant green coating on the substrate to drive off the binder and convert the glass powder in both layers to glass-ceramic layers.

21. The method according to claim 20, in which the first layer is applied by one of a screen printing and a spraying process.

22. The method according to claim 20, in which the first layer is not more than about 50 $\mu$m in thickness.

23. The method according to claim 20, in which the second layer is between about 100 $\mu$m and 3 mm in thickness.

24. A fuel cell having separator plates each coated by the method according to claim 20.

25. A glass-ceramic coating bonded to a substrate in a fuel cell, comprising: a first, bonding layer of a glass powder mixed with a binder deposited directly onto the substrate; a laminar body comprising a glass powder mixed with a binder adhered to the first layer to form a second layer which is substantially thicker than the first layer; the glass powder in the first layer having a different composition to that of the glass powder in the second layer, the glass powder in the first layer having a composition selected to bond with the substrate; the glass powder in both layers having been converted to glass-ceramic material by a heat-treatment.

26. A fuel cell having separator plates provided with the glass-ceramic coating according to claim 25.

* * * * *